United States Patent

[11] 3,547,380

| [72] | Inventors | Peter G. Kappus;<br>William H. Long, Cincinnati, Ohio |
|---|---|---|
| [21] | Appl. No. | 668,581 |
| [22] | Filed | Sept. 18, 1967 |
| [45] | Patented | Dec. 15, 1970 |
| [73] | Assignee | General Electric Company<br>a corporation of New York |

[54] AIRCRAFT NUCLEAR PROPULSION SYSTEM
9 Claims, 2 Drawing Figs.

[52] U.S. Cl. .................................................. 244/55;
176/52; 60/59, 60/203
[51] Int. Cl. ...................................................... B64d 27/22
[50] Field of Search .......................................... 244/53, 55,
58, 62, 73, 15; 176/52; 60/39.19, 39.18, 36,
59, 203, 226, 244

[56] References Cited
UNITED STATES PATENTS

| 2,604,277 | 7/1952 | Anxionnaz et al. | 244/15 |
| 3,229,933 | 1/1966 | Kutney | 244/55 |
| 3,235,205 | 2/1966 | Newcomb | 244/54 |

FOREIGN PATENTS

| 1,178,646 | 12/1958 | France | 60/226 |

OTHER REFERENCES
Nuclear-Chemical Hybrids, G.N. Nesterenko et al. Space/Aeronautics, April 1959, pp. 47— 49

*Primary Examiner*—Fergus S. Middleton
*Assistant Examiner*—James E. Pittenger
*Attorneys*—Derek P. Lawrence, Frank L. Neuhauser, Oscar B. Waddell and Loren W. Peters

ABSTRACT: A nuclear power plant includes a closed reactor circuit within which a medium heated by the nuclear reactor transfers energy to a propulsion fluid in a two-step process, the first step being a mechanical transformation and the second step being a thermal transformation of energy.

PATENTED DEC 15 1970
3,547,380
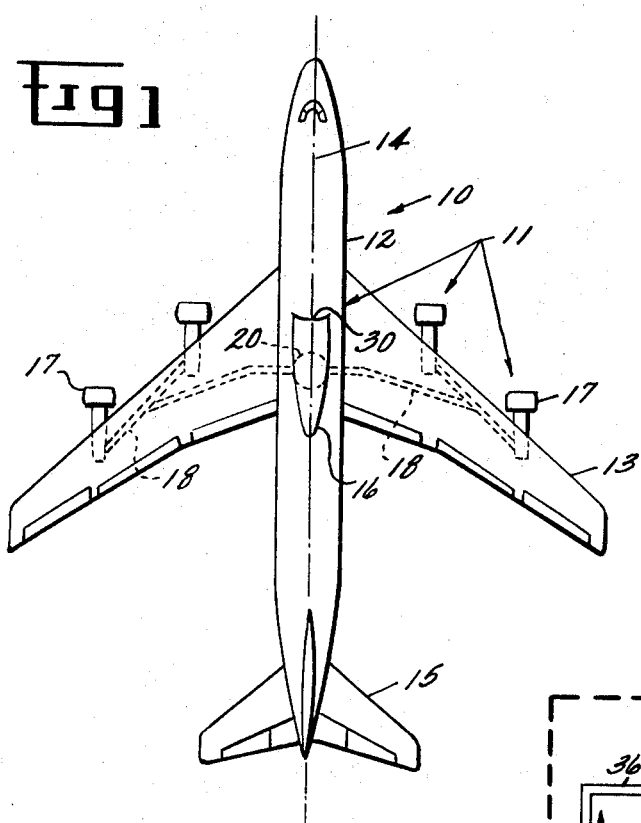
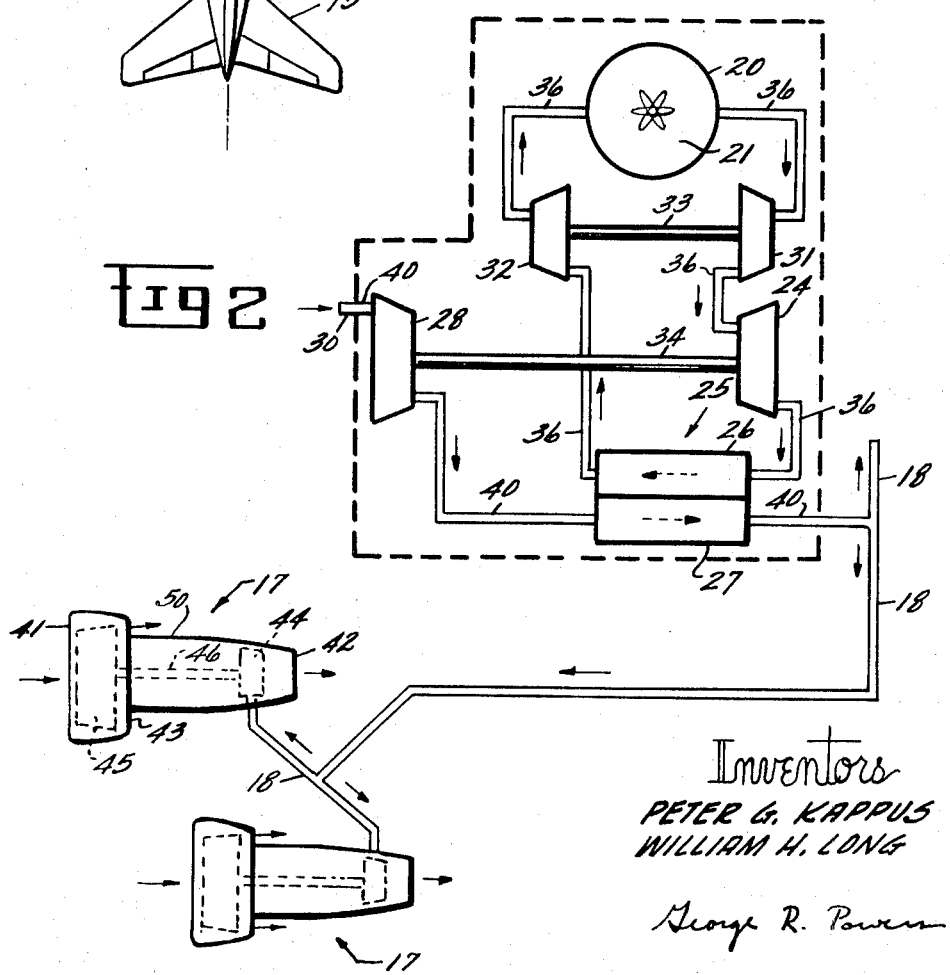
Inventors
PETER G. KAPPUS
WILLIAM H. LONG
George R. Powers
ATTORNEY

AIRCRAFT NUCLEAR PROPULSION SYSTEM

This invention relates to a nuclear power plant and, more particularly, to an aircraft nuclear propulsion system characterized by high cycle and propulsive efficiencies in combination with minimum bulk and weight.

While nuclear power plants have been extensively used in the past for stationary power generation and ship propulsion, the size and weight of conventional nuclear power plants relative to useful power output have effectively ruled out their use for aircraft propulsion. A contributing factor to this situation is, of course, the requirement that nuclear power plants include heavy shielding in order to protect personnel, the installation, and the surrounding regions. In addition, the low cycle efficiencies inherent in nuclear power plant designs previously proposed for aircraft propulsion have required for adequate power output relative large and bulky power plant components, including turbomachinery as well as the nuclear reactors. In other words, nuclear power plants proposed heretofore for aircraft propulsion have had thrust-to-weight ratios well below that considered necessary for economic utilization.

Furthermore, the actual operational suitability of an aircraft propulsion system depends, to a large extend, on its installed drag and its ability to fit within a lightweight and aerodynamically well-shaped aircraft. Modern subsonic aircraft using conventional gas turbine engine power plants gain considerable advantage from the mounting of low drag power plant nacelles and fuel tanks on the wings since this arrangement thus spreads both engine and fuel weight over the spans of the aircraft wings. Among other advantages, this mounting arrangement provides relief loads for wing bending moments and permits the use of wings having long spans relative to chord length (high aspect ratio). Unfortunately, a shielded nuclear reactor, which has a weight equivalent to that of a typical fuel load in a conventional aircraft, cannot be spread over the wing span. A shielded nuclear reactor thus constitutes a very heavy concentrated mass which must be located on the aircraft center line (overall power plant weight would go up significantly if the reactor were split into two units for wing mounting). To avoid leakage of the high-temperature and high-pressure medium heated in the nuclear reactor and to maintain minimum weight it is also desirable, if not necessary, to install associated energy transfer equipment within the fuselage or otherwise close to the reactor and the aircraft center line. In view of the above considerations, nuclear propulsion systems proposed heretofore have not been successful in distributing power plant weight across the wing span to any significant extent in order to achieve the advantage of high aspect ratio wings for subsonic propulsion.

It is therefore an object of this invention to provide an improved and practical nuclear power plant for propulsion purposes.

Another object of this invention is to provide an aircraft nuclear propulsion system having a high thrust-to-weight ratio.

Still another object is to provide a nuclear propulsion system utilizing lightweight components having relative high efficiencies.

A further object is to provide for aircraft propulsion a nuclear power plant having high cycle and propulsive efficiencies in combination with minimum bulk and weight.

A still further object is to provide for aircraft a nuclear propulsion system in which at least a portion of the power plant weight can be spread across high aspect ratio wings.

Briefly stated, in carrying out the invention in one form, a nuclear power plant, preferably for aircraft propulsion, includes a closed reactor fluid circuit through which a working medium, preferably an inert gas such as helium, heated by the nuclear reactor apparatus is sequentially directed through a primary power turbine and heat exchanger and then returned to the nuclear reactor apparatus for recirculation. To provide a primary thrust component, atmospheric air is inducted through a primary inlet and is discharged as energized fluid through a primary outlet, the primary inlet and outlet being interconnected by primary conduit means which directs the inducted air from the primary inlet sequentially through a primary compressor and the heat exchanger before delivering the air to the primary outlet. The primary compressor is driven by the primary power turbine such that energy is transferred mechanically from the reactor circuit to the propulsion air, and the heat exchanger directs the reactor working fluid and the compressed air relative to each other through the exchange passages such that energy is transferred thermally therebetween. To achieve suitable efficiency levels, the heat exchanger operates at the maximum possible temperature permitted by state-of-the-art materials used for heat exchange construction. In a preferred embodiment of the invention for subsonic propulsion, the energized air leaving the heat exchanger is first directed through a secondary power turbine for driving a secondary compressor before being supplied to the primary outlet. In this embodiment, a secondary stream of atmospheric air is compressed by the secondary compressor and is accelerated therefrom through a nozzle to the atmosphere to produce a secondary thrust component.

By a further aspect of the invention, the nuclear reactor apparatus and its associated equipment, including the primary power turbine and the primary compressor, are located on the center line of the aircraft and a number of propulsion units are remotely mounted in a symmetrical fashion on the wings. Each of the symmetrically mounted propulsion units includes a secondary power turbine and a secondary compressor, the secondary power turbine being supplied with energized air from the centrally located heat exchanger by suitable ducts in the aircraft wings. This arrangement permits the spreading of a portion of the power plant weight across the wing span of the aircraft, thus permitting the use of higher aspect ratio wings than would otherwise be possible.

While the novel features of the invention are set forth with particularity in the appended claims, the invention, both as to organization and content, will be better appreciated, along with the other objects and features thereof, from the following detailed description when taken in conjunction with the drawing, in which:

FIG. 1 is a plan view of an aircraft powered by a nuclear propulsion system of this invention, the system including remotely mounted propulsion units mounted on the aircraft wings; and FIG. 2 is a schematic view of the power plant of FIG. 1, the fuselage mounted components being enclosed by a heavy broken line.

Turning attention to FIG. 1, an aircraft 10 powered by a nuclear propulsion power plant 11 of this invention is illustrated, the aircraft 10 being designed for subsonic flight and including a fuselage 12, a pair of wings 13 projecting laterally from the fuselage 12 and the longitudinal axis 14 of the aircraft, and a tail assembly 15. The propulsion system includes a centrally disposed unit 16 located within the fuselage 12 on the axis 14 and a plurality of propulsion units 17 symmetrically mounted on the wings 13, the central unit 16 and the propulsion units 17 being interconnected by ducts 18 in the wings 13. This particular arrangement of power plant components results in the spreading of a portion of the overall power plant weight across the wing span, thus permitting the use of relatively high aspect ratio wings (aspect ratio being the ratio of wing span to chord).

As indicated above, the nuclear power plant 11 of this invention is compact and lightweight and operates with high cycle and propulsive efficiencies. To appreciate these characteristics, it is first necessary to understand the precise arrangement of power plant components taught by the present invention. To this end, attention is directed to FIGS. 1 and 2 for a detailed description of the power plant 11. As illustrated, the central unit 16 of the power plant 11 includes a single nuclear reactor apparatus 20 located within the fuselage 12 on the longitudinal axis 14, the nuclear reactor 20 including a core 21 through which an inert gas such as helium is continuously circulated during power plant operation. By using an inert gas as the medium circulated through the core 21, it is only necessary to shield the reactor itself and not the ancillary equipment also located in the central unit 16. More particularly, the central unit 16 also includes the components enclosed by the heavy broken line of FIG. 2, these including a primary power turbine 24, a heat exchanger 25 having first and second sets of heat exchange passages 26 and 27, respectively, arranged in counterflow relationship, a primary compressor 28, an air inlet 30 communicating with the atmosphere, an accessory turbine 31, and an accessory compressor 32. The accessory turbine 31 and the accessory compressor 32 are connected by a shaft 33 so that the compressor 32 may be driven by the turbine 31, and the primary power turbine 24 and the primary compressor 28 are connected by a shaft 34 so that the compressor 28 may be driven by the turbine 24. Closed conduit means 36 formed by ducts or other suitable structure forms and closed loop interconnecting the reactor core 21, the accessory turbine 31, the primary power turbine 24, the first set of heat exchange passages 26, the accessory compressor 32, and the reactor core 21 for continuous flow of the inert gas therethrough in the direction indicated by the arrows. During power plant operation, the inert gas is heated to high temperature and high-pressure conditions in the reactor core 21 and is then supplied to the accessory turbine 31 and the main power turbine 24 where a portion of its energy is extracted mechanically. After passing through the primary power turbine 24, the inert gas passes through the heat exchanger 25 where additional energy is extracted thermally and the accessory compressor 32 where sufficient energy is returned to the gas to return it to the reactor 20. The accessory turbine and the accessory compressor are thus simply a pumping mechanism for the inert gas and, as such, are quite small and do not represent any substantial input or output of energy. On the other hand, it will soon become obvious that large amounts of energy are removed from the inert gas in mechanical and thermal form by the primary power turbine 24 and the heat exchanger 25.

The central unit 16 also includes open conduit means 40 formed of ducts or similar structure interconnecting the inlet 30, the primary compressor 28, the second set of heat exchange passages 27, and the ducts 18 leading to the multiple propulsion units 17. During power plant operation, atmospheric air is inducted through the inlet 30 and then compressed to high pressure by the compressor 28, after which its energy is increased still further by heat transferred to it in the heat exchanger 25. The energized air discharged from the heat exchanger 25 is then supplied to the ducts 18 for delivery to the propulsion units 17.

At this point it will be apparent that the central unit 16 is actually a gas generator for producing and supplying high energy air which can be subsequently used for producing thrust. The particular arrangement of components taught by this invention, however, permits the central unit 16 to operate in an extremely efficient manner. As a result, the components can be relatively small and lightweight. By way of explanation, it is pointed out that common materials used in the construction of heat exchangers such as the heat exchanger 25 are unable to operate for prolonged periods at temperatures much above 1,500° F. because of the oxidizing atmosphere present therein during power plant operation, whereas it is well within the state of the art to build turbines and nuclear reactors capable of operating at temperatures far above 1,500° F. Accordingly, the temperature of the air leaving the heat exchanger 25 is limited by the temperature capabilities of the materials of the heat exchanger 25. In the arrangement of this invention, this air can be used at its maximum energy level for providing propulsive thrust since the turbine 24 and the compressor 28 are driven by the working fluid at temperatures substantially above 1,500° F., not energized air leaving the heat exchanger 25. If the energized air were used to drive the turbine 24, the air could no longer be used at its maximum energy level for propulsion. To obtain sufficient power output from such reduced energy air, it would be necessary to increase the total air flow and inert gas flow, and consequently, the size and weight of all components. In addition, the turbine 24 would be much less efficient, and would have to be still larger and heavier, than in the arrangement of this invention since it would be operating at sharply reduced temperature and pressure levels.

To provide propulsive thrust, the energized air is supplied through the ducts 18 to the propulsion units 17, only two of which are illustrated by FIG. 2. Each propulsion unit 17 includes an aerodynamically streamlined nacelle 50 having an inlet 41 and a pair of outlets 42 and 43. Within the nacelle 50 is a secondary turbine 44 connected to the ducts 18 for receiving energized air therefrom and a secondary compressor, or fan 45 driven by the turbine 44 through a shaft 46. During power plant operation, energized air supplied by the ducts 18 drives the turbine 44 and the compressor 45, the reduced energy air then being expanded to atmosphere through the primary nozzle 42 to produce a first thrust component. The energy extracted by the turbine 44 is used to compress air inducted through the inlet 41, the compressed air then being expanded to atmosphere through the secondary nozzle 43 to produce a second thrust component. For subsonic aircraft, this arrangement within the propulsion units 17 provides a high propulsive efficiency since the energized air supplied from the central unit 16 is not merely discharged as a high velocity jet, but is first used to accelerate additional air through the fan 45. As a result, a much greater mass of propulsion air is discharged at a much lower velocity approaching that of the aircraft 10. For high propulsion efficiency in subsonic aircraft, it is desirable that the mass flow through the fan 45 be substantially greater than that through the turbine 44, preferably at least two or three times as great. In addition, a relatively high-mass flow through the fan 45 assures minimum bulk and weight of the hot air ducts 18, the primary turbomachinery in the central unit 16 and the secondary power turbine 44 and its nozzle 42.

In addition to providing high propulsive efficiency, the propulsion units 17 also distribute a portion of the overall power plant weight across the wings 13, thereby providing relief loads for wing bending moments and permitting high wing aspect ratios than would otherwise be possible. It might occur to some that it would be desirable to move some of the components of the central unit 16 out onto the wings 13 to further distribute the weight; more particularly, it might be suggested that the heat exchanger 25, the primary power turbine 24, and the primary compressor 28 be divided into multiple components located in the nacelles 50. This approach may not be entirely satisfactory under all conditions since it requires the ducting of high-temperature and high-pressure inert gas through the wings 13. In order to contain the gas under such conditions, the ducting must be heavier than the ducts 18 carrying the relatively low-temperature and low-pressure air.

In practice, however, it may be desirable to divide the heat exchanger 25 and the turbomachinery components of the central unit 16 into multiple units for supplying the individual propulsion units 17. In such a case, the multiple units should still be located in or closely adjacent the reactor 20 in order to avoid heavy ducting for the inert gas and to permit easy removal of the reactor 20 and its associated equipment as a single unit in the event that servicing is required. While the heat exchanger 25 and the turbomachinery components can be divided in this manner into a number of smaller units without a weight penalty, the reactor 20 should not be divided since the weight of its shielding would go up unduly if such were attempted.

Various alternative arrangements in addition to those discussed above may occur to those skilled in the art. For example, the propulsion units 17 could utilize tip turbine fans in which the secondary compressor and the secondary turbine are combined into a single entity with the turbine buckets mounted on the tips of the compressor blades. In such an arrangement, the primary and secondary air streams would probably be mixed and discharged through a single nozzle. For propelling supersonic aircraft, it may be desirable to discharge the energized air leaving the heat exchanger directly to atmosphere as a high velocity jet rather than drive a secondary fan since supersonic propulsive efficiencies are quite high with a pure jet and it is not as desirable that supersonic aircraft have relief loaded high aspect ratio wings. In this case, chemical reheat of the energized air may be desirable for acceleration to supersonic flight speed. It will also occur to those skilled in the art that the nuclear propulsion system of this invention could also be used for propelling vehicles other than aircraft, such as high-speed ships, ground effect machines, etc.

From the foregoing, it will be appreciated that the aircraft nuclear propulsion system of this invention provides a relatively high cycle and propulsive efficiencies with lightweight components and, consequently, a high thrust-to-weight ratio. In addition, the propulsion system permits the spreading of at least a portion of its weight across the wing span of the aircraft, thereby providing relief loading for wing bending moments and permitting the use of high aspect ratio wings.

It will be understood that the invention is not limited to the specific details of the construction and arrangement of the particular embodiment illustrated or otherwise described herein. It is therefore intended to cover in the appended claims all such changes and modifications which may occur to those skilled in the art without departing from the true spirit and scope of the invention.

We claim:

1. A nuclear power system comprising:
   nuclear reactor apparatus including a reactor core, and a cooling medium for said core;
   a primary power turbine adapted to extract substantial energy from said cooling medium;
   a heat exchanger including first and second passage means disposed in heat exchange relation;
   closed conduit means serially interconnecting said nuclear reactor apparatus, said primary power turbine, said first passage means of said heat exchanger, and said nuclear reactor apparatus such that said cooling medium may be sequentially directed through said primary power turbine to drive said power turbine and said heat exchanger and then returned to said nuclear reactor apparatus, means for circulating said cooling medium through said closed conduit means and returning it to said nuclear reactor apparatus;
   primary inlet means communicating with the atmosphere;
   a primary compressor adapted to compress atmospheric air to a high pressure;
   means interconnecting said primary power turbine and said primary compressor for driving said primary compressor from said primary power turbine;
   at least one secondary power turbine;
   primary outlet means communicating with the atmosphere;
   at least one energy absorbing device;
   means interconnecting said secondary power turbine and said energy absorbing device for driving said energy absorbing device from said secondary power turbine;
   and primary open conduit means serially interconnecting said primary inlet means, said primary compressor, said second passage means of said heat exchanger, said secondary power turbine, and said primary outlet means such that atmospheric air inducted through said primary inlet means is sequentially directed through said primary compressor and said heat exchanger to increase its energy level, then through said secondary power turbine where at least a substantial portion of its energy is extracted to drive said energy absorbing device, and then discharged to atmosphere through said primary outlet means; and whereby energy is transferred from the medium heated by said nuclear reactor apparatus to air inducted by said primary inlet means both mechanically through said primary power turbine and said primary compressor and thermally through said heat exchanger.

2. A nuclear power system as defined by claim 1 in which the said medium is an inert gas directed by said closed conduit means through the core of the nuclear reactor apparatus, and said means for circulating said medium comprises:
   an accessory turbine connected to said closed conduit means upstream of said heat exchanger and an accessory compressor connected to said closed conduit means downstream of said heat exchanger; and
   and means interconnecting said accessory turbine and said accessory compressor for driving said accessory compressor from said accessory turbine so as to thereby circulate the inert gas through said closed conduit means.

3. An aircraft propulsion system comprising a nuclear power system as defined by claim 2 in which said energy absorbing device is a secondary compressor, said aircraft propulsion system further comprising:
   secondary inlet means communicating with the atmosphere;
   secondary outlet means communicating with the atmosphere;
   and secondary open conduit means serially interconnecting said secondary inlet means, said secondary compressor, and said secondary outlet means such that atmospheric air inducted through said secondary inlet means is directed through said secondary compressor to increase its energy level and then discharged to atmosphere through said secondary outlet means; and
   said primary outlet means and said secondary outlet means comprising nozzles through which energized air is expanded to atmosphere to provide propulsive thrust.

4. An aircraft propulsion system as defined by claim 3 in which the mass rate of air flow through said secondary open conduit means and said secondary outlet nozzle is substantially greater than the mass rate of air flow through said primary open conduit means and said primary outlet nozzle.

5. In an aircraft including a fuselage disposed coaxially with the longitudinal axis of the aircraft and wings projecting laterally from the fuselage and the longitudinal axis of the aircraft, the aircraft propulsion system recited in claim 3 wherein:
   said reactor core is mounted on the longitudinal axis of the aircraft; and
   said propulsion system includes an even number of apparatus combinations comprising said secondary inlet means, and secondary outlet means, said secondary power turbine, said secondary compressor, said secondary compressor driving means, said secondary open conduit means, and said primary outlet means interconnected as recited in claim 7, said apparatus combinations being symmetrically disposed with respect to the longitudinal axis of the aircraft.

6. A propulsion system as defined by claim 5 in which said propulsion units are mounted on the wings of the aircraft a substantial distance from the longitudinal axis of the aircraft and in which said primary power turbine, said heat exchanger, and said primary compressor are located with said nuclear reactor apparatus on the longitudinal axis of the aircraft, said primary open conduit means including ducts in the wings of the aircraft interconnecting said heat exchanger and said secondary power turbine, whereby the weight of the propulsion system is partially spread across the wing span of the aircraft so as to permit the use of high aspect ratio wings.

7. A propulsion system as defined by claim 6 in which said propulsion units are disposed in aerodynamically streamlined nacelles so as to minimize aerodynamic drag during aircraft operation.

8. A propulsion system as defined by claim 7 in which the inert gas heated in the core of the nuclear reactor apparatus is helium.

9. The nuclear power system recited in claim 1 wherein:
   said reactor cooling medium operates at temperatures substantially above the practical limit of operation of said heat exchanger and within the practical limit of turbine inlet fluid temperature of said primary turbine;
   and further wherein said primary turbine is adapted to extract from said reactor cooling medium sufficient energy to reduce the temperature thereof to a level within the practical limit of operation of said heat exchanger and to transfer said energy via said primary compressor to the air entering said primary inlet means; and whereby the air passing through said primary open conduit means is energized by said primary compressor and said heat exchanger to a level sufficient for efficient operation of said secondary power turbine.